N. W. STORER.
OVER-SPEED PROTECTING DEVICE FOR ELECTRIC MOTORS.
APPLICATION FILED NOV. 24, 1911.
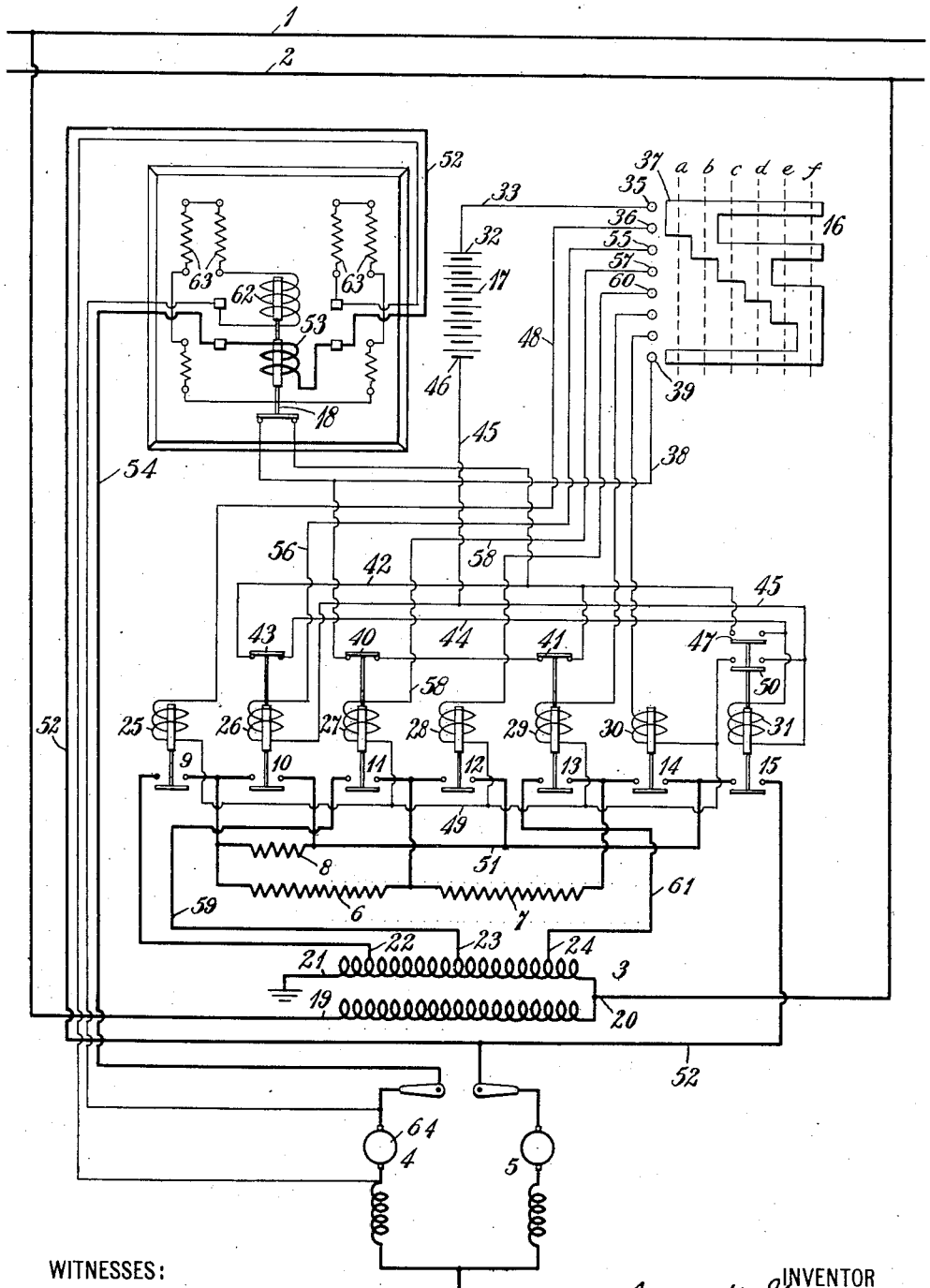

UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

OVER-SPEED PROTECTING DEVICE FOR ELECTRIC MOTORS.

1,161,994. Specification of Letters Patent. Patented Nov. 30, 1915.

Application filed November 24, 1911. Serial No. 662,175.

*To all whom it may concern:*

Be it known that I, NORMAN W. STORER, a citizen of the United States, and a resident of Pittsburgh, in the county of Allegheny and State of Pennsylvania, have invented a new and useful Improvement in Over-Speed Protecting Devices for Electric Motors, of which the following is a specification.

My invention relates to systems of electric motor control and it has special reference to such systems as are adapted to govern alternating current motors having series characteristics.

The object of my invention is to provide a single means which is simple and inexpensive in construction for automatically preventing the motor or motors of a railway vehicle from attaining dangerously high speeds. While my invention is not restricted in this regard, it is particularly intended for use with alternating current railway vehicle control systems embodying one or more single-phase motors having series characteristics, the motors being supplied with energy from a voltage-regulating transformer. It has been my aim to provide a single means of the character above indicated for automatically interrupting the motor circuit whenever the speed of the motor attains a predetermined value, irrespective of the transformer tap from which the motor is being supplied with energy at the time.

In a more limited aspect, my invention comprises a relay switch which governs the main control circuit of the systems and is provided with two magnet coils which act in opposition to each other and which are respectively connected across the armature of the motor and in series with the motor circuit, the coils being so proportioned that the counter-electromotive force generated in the motor armature is just sufficient to overcome the effect of the series coil and to open the relay switch when the motor acquires a predetermined speed, irrespective of the voltage applied to the motor terminals.

The single figure of the accompanying drawing is a diagrammatic view of a system of control embodying my invention.

Referring to the drawing, the system here shown comprises supply circuit conductors 1 and 2, a voltage-regulating transformer 3, electric motors 4 and 5, resistor sections 6, 7 and 8, a plurality of independently operated switches 9 to 15, inclusive, a master controller 16, a storage battery 17 and an over-speed relay switch 18.

The supply circuit conductors 1 and 2 are respectively connected to a terminal 19 and an intermediate tap 20 of the transformer 3, the opposite terminal 21 of which is connected to ground. The switches 9 to 15, inclusive, are adapted to control the amount of resistance included in the motor circuit and to determine to which of the transformer taps 22, 23 or 24 the motors are connected. The master controller 16 is adapted to occupy a plurality of positions *a* to *f*, inclusive, and governs the energization of the switch coils 25 to 31, inclusive.

The operation of, and the circuit connections for the system are as follows: Assuming that the switches occupy the positions shown in the diagram, if master switch 16 is moved to position *a*, a circuit is established from a terminal 32 of the storage battery 17, through conductor 33, contact fingers 35 and 39, which are bridged by contact segment 37 to conductor 38, circuit being continued from this point either through the relay switch 18, if closed, or through auxiliary switches 40 and 41 of switches 11 and 13, to conductor 42. Circuit is completed through auxiliary switch 43 of switch 10, conductor 44, coil 31 of switch 15 and conductor 45, to the opposite terminal 46 of the storage battery.

It is evident that switch 15 can be closed only when switch 10 is open and either when relay switch 18 is closed or both switches 11 and 13 are open. When closed, however, the coil 31 of switch 15 is energized from conductor 42, through auxiliary switch 47 and therefore remains closed irrespective of the subsequent closure of switch 10. Switch 9 is closed immediately after the closing of switch 15, circuit being completed from contact segment 37 through contact finger 36, conductor 48, coil 25, conductor 49, auxiliary switch 50 of switch 15 and conductor 45 to battery terminal 46. Switches 9 and 15 are thus closed and a motor circuit is established from transformer tap 22, through switch 9, resistor section 8, conductor 51, switch 15, conductor 52, series coil 53 of relay switch 18 and conductor 54, circuit being completed through the motor 4 and direct from conductor 52 through the motor 5, to ground. Since transformer tap 22 is nearest to the grounded transformer terminal 21, a comparatively low voltage is impressed upon the motor terminals.

When master switch 16 is moved into position b, and contact finger 55 moves into engagement with the contact segment 37, energy is supplied through conductor 56 to winding 26 of switch 10, circuit being completed through negative conductor 45 as before. The switch 10, when closed, short circuits resistor section 8 and the full voltage of the tap 22 is supplied to the motors.

It is evident that the closing of switches 9 and 10 is independent of the overspeed relay switch 18 and, consequently, the opening of the relay has no effect, so long as the master switch occupies position a or position b.

When the master controller occupies position c, contact finger 57 engages contact segment 37 and energy is supplied through conductor 58 to coil 27 of switch 11, and contact finger 36 moves out of engagement with the segment 37 so that switch 11 is closed and switch 9 is permitted to open. When switch 11 is closed, the motor circuit is established from transformer tap 23, through conductor 59, switch 11, resistor section 6, switch 10, conductor 51, and switch 15, circuit being completed from this point, as already described. The closing of switch 11 interrupts the shunt circuit to the relay switch 18 at switch 40 and consequently renders the overspeed relay effective at this point.

In position d of the master switch, contact finger 60 engages contact segment 37, and coil 28 of switch 12 is energized. The motor circuit is now established directly from tap 23 through switches 11 and 12, conductor 51 and switch 15, to the motors, as before, the resistor section 6 being short circuited.

In position e, switch 13 is closed and switch 11 is open, motor circuit being established from transformer tap 24, through conductor 61, resistor section 7, and switches 12 and 15 to the motors, and, in position f, the resistor section 7 is short circuited by closing of switch 14, circuit being then established directly from tap 24, through switches 13, 14 and 15 to the motor. The shunt circuit to the relay switch 18 is now interrupted at switch 41 instead of at switch 40.

While I have shown only two motors and have indicated no means for reversing their operation, my invention is not restricted to the specific arrangement illustrated and may be used in connection with systems embodying either automatic acceleration or hand-operated control and either reversible or non-reversible motors.

The overspeed relay switch 18 is further provided with a coil 62 which is connected in series with a plurality of resistor sections 63 across the terminals of armature 64 of motor 4. The coil 53 tends to close the switch 18 while the coil 62 acts in opposition to the coil 53 and tends to open it, the coils being so proportioned that the switch 18 will be opened when the motor 4 attains a predetermined speed, whether the motor is connected to tap 23 or tap 24 of the transformer 3.

It will be understood by those skilled in the art that the counter-electromotive force of the motor armature 64 and the pull exerted by the coil 62 will depend, not only upon the speed of the motor, but also upon the voltage impressed on the motor circuit. Therefore, in order to adequately protect the motor from exceeding predetermined speed limits, irrespective of the voltage impressed on the motor terminals, I have provided the coil 53 which is energized by the current in the motor circuit and, consequently, varies not only according to the motor load, but also according to the voltage impressed on the motor circuit.

When the motor speed exceeds a predetermined value and relay switch 18 is opened, the control circuit which was established from terminal 32 of storage battery 17, through coil 31 of switch 15, is interrupted and, consequently switch 15 and all of the control switches which depend upon switch 50 are opened. The motor circuit is thus interrupted but switch 10 remains closed if the master switch 16 occupies any of its positions other than position a. Since switch 15 cannot be closed unless switch 10 is open, it is evident that the master switch must be returned to its first position in order to start the motors subsequent to the action of the overspeed relay. As soon as the motor circuit is interrupted, the series coil 53 is deënergized and, consequently, the switch 18 is held open by the coil 62 until the motor 4 comes to rest.

In order to avoid injuring the motors when the relay switch 18 is again closed, I have, as above indicated, so designed the master switch as to necessitate its being returned to its position a before the motor circuit can be reëstablished.

I claim as my invention:

1. In a control system for electric motors, the combination with a multi-voltage supply circuit, a motor, and means for controlling the voltage impressed upon the motor, of a switch having a closing coil that is operatively dependent upon the current supplied to the motor, and a coil that tends to open the switch in accordance with the counter-electromotive force generated in the motor armature.

2. In a control system for electric motors, the combination with a multi-voltage supply circuit, a motor, a plurality of control switches for governing the voltage impressed upon the motor, and an overspeed relay switch for interrupting the closing circuit of one of the control switches when the motor attains a predetermined speed, of interlocking means between the switches for completing a shunt circuit to the relay switch when the motor is supplied with energy at low voltage.

3. In a control system, the combination with an alternating current supply circuit, a transformer connected thereto and having a plurality of intermediate taps, an electric motor having a series characteristic, and means for connecting the motor selectively to the transformer taps, of means for interrupting the motor circuit at a predetermined speed except when the motor is supplied with energy from a low-voltage tap of the transformer.

4. In a system of control, the combination with an electric motor, a subdivided source of energy, and a plurality of switching devices for connecting said motor to said subdivided source whereby different voltages are supplied thereto, of means for interrupting the circuit of said motor under predetermined speed conditions, and means for preventing such action when the motor is supplied with low voltage from said subdivided source.

5. In a system of control, the combination with an electric motor, a subdivided source of energy and a plurality of switching devices for connecting said motor to said subdivided source whereby different voltages are supplied thereto, of automatic means responsive to electrical conditions of said motor for interrupting the circuit of said motor, and means for rendering said automatic means ineffective when the motor is supplied with energy at low voltage.

6. In a system of control, the combination with a subdivided source of energy, an electric motor and a plurality of electrically controlled switches for connecting said motor to said subdivided source whereby different voltages are supplied thereto, of an electro-responsive overspeed relay switch for deenergizing one of said electrically controlled switches to effect the interruption of the circuit of said motor under predetermined speed conditions, and interlocking means associated with another of said switches for preventing the operation of said relay switch when low voltage is supplied to said motor.

7. In a system of control, the combination with an electric motor, a subdivided source of energy and a plurality of switching devices for connecting said motor to said subdivided source whereby different voltages are supplied thereto, of means for interrupting the circuit of said motor under predetermined speed conditions, and means dependent upon the position of certain of said switching devices for preventing the reclosure of the motor circuit while said switching device occupies a predetermined position.

8. In a system of control, the combination with a subdivided source of energy, an electric motor, a plurality of electrically controlled switches for connecting said motor to said subdivided source whereby different voltages are supplied thereto, and a master controller for governing the operation of said switches, of electro-responsive means for deënergizing one of said electrically controlled switches to interrupt the motor circuit when a predetermined speed of said motor is attained, and interlocking means coöperating with one of the low-voltage switches for preventing the reënergization of said circuit-interrupting switch until the master controller is moved to a predetermined position.

In testimony whereof, I have hereunto subscribed my name this 21st day of Nov. 1911.

NORMAN W. STORER.

Witnesses:
E. W. P. SMITH,
B. B. HINES.